Figure 1:
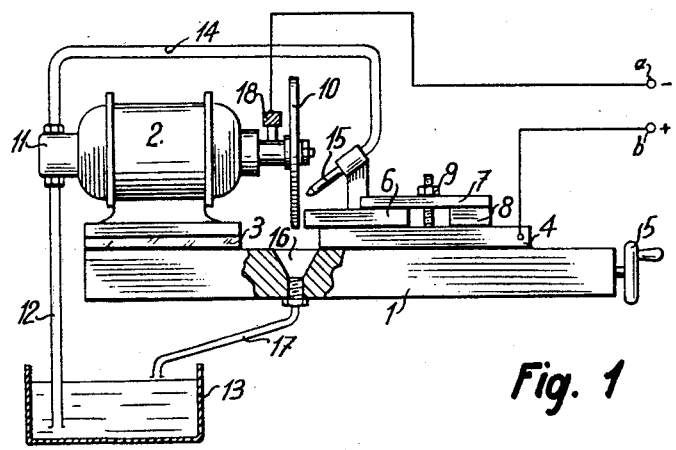

Oct. 30, 1962  J. PFAU  3,061,708
ELECTRIC MACHINING PROCESSES
Filed Sept. 30, 1959

United States Patent Office 3,061,708
Patented Oct. 30, 1962

3,061,708
ELECTRIC MACHINING PROCESSES
Jean Pfau, Geneva, Switzerland, assignor to Ateliers des Charmilles S.A., Geneva, Switzerland, a corporation of Switzerland
Filed Sept. 30, 1959, Ser. No. 843,583
Claims priority, application Switzerland Oct. 1, 1958
12 Claims. (Cl. 219—69)

Different electric machining processes are already known. Amongst these may be mentioned the process of machining by electro-erosion, which consists in causing successive sparks to burst between a work-piece and an electrode which has the shape which it is desired to impart to the work-piece. These sparks are furnished, in general, by a pulse generator which supplies a relatively high voltage, in general, more than 100 volts, and which produces sudden discharges by causing a spark to explode through a dielectric liquid which separates the work-piece from the electrode. It will be understood that the voltage applied between the electrode and the work-piece should be higher than the disruptive voltage between these parts, which itself is evidently higher than the arc voltage. Each spark detaches a little metal from the work-piece but it also removes metal from the electrode, the wear of said latter may be comprised between 20 and 100% of the quantity of material removed from the work-piece, when the electrode and the work-piece are of the same metal.

Another known process consists in applying a voltage of the order of 40 volts between the electrode-tool in movement and the work-piece. The electrode-tool is constituted, for example, by a disc driven in rotation. In this process, which is called anodo-mechanical process, there is interposed, for example, an aqueous solution of silicate of soda between the disc and the work-piece and the electrolysis due to the passage of current provokes a solid and insulating deposit on the work-piece. There are then produced arcs of short duration through the insulating layer and these arcs detach metal from the work-piece by locally destroying this layer, which re-forms immediately by electrolysis. In a similar process insulating and charged particles in colloidal suspension are interposed between the electrode-tool and the work-piece. These particles, which, for example, may be constituted by dextrine or talcum, are conducted through a liquid, generally a poor conductor, and a source of voltage, usually comprised between 25 and 80 volts, cause a current to pass between the part to be machined and the disc. On the work-piece there is formed an insulating layer as in the preceding process. These two processes permit of obtaining relatively high machining speeds, of the order of many hundreds of mm.³ per minute, but are not suitable for precision machining.

Another known process is called electrolytic process. It also consists in causing current to pass between an electrode constituted, in general, by a rotary disc and a work-piece, an aqueous solution of a salt being interposed between the work-piece and the electrode. The electric voltage applied is of the order of 5 to 40 volts and the passage of current provokes an anodic dissolution of electro-chemical nature of the work-piece, whilst the aqueous solution, which constitutes the machining liquid, is subjected to an electrolytic decomposition. This process gives good results when the distance between the work-piece and the electrode is of the order of a few microns. In order to be able to maintain a very small distance it is necessary to use an abrasive disc and conductor as electrode, also adapted for scraping off the salts and oxides which are formed on the work-piece during machining. It is difficult to avoid phenomena of electrolytic dissolution at a great distance which hitherto limited the precision of machining.

The present invention has for its subject an electric machining process according to which an electric current is caused to pass between a work-piece and an electrode which are in relative movement, one relative to the other, characterised in that there are directed between the electrode and the work-piece, solid and electrically conducting particles, of which the dimension is smaller than the distance between the electrode and the work-piece. This process has numerous advantages relatively to the different known processes, as it permits of operating with good conditions of stability, with an electrode-piece distance greater than in known processes, this distance being capable of being fixed, for example, at a value comprised between 5 and 25 microns. As a result it is no longer necessary to have to resort to abrasive discs, difficult to shape, for constituting the electrode. Further, it is possible to vary the distance between the electrode and the work-piece by acting on the concentration and the dimension of the particles. The speed of machining is high and it increases proportionately to the surface to be machined. On the other hand, the erosive action being strictly limited to the portion of the work-piece, which is opposite the electrode-tool, this machining process is extremely precise. This process is particularly indicated for rectification or shaping operations. In this latter case, the electrode-tool is constituted by a disc of which the working surface is the peripheral surface of the disc and has a shape corresponding with that which is desired to obtain on the work-piece.

Figure 2:
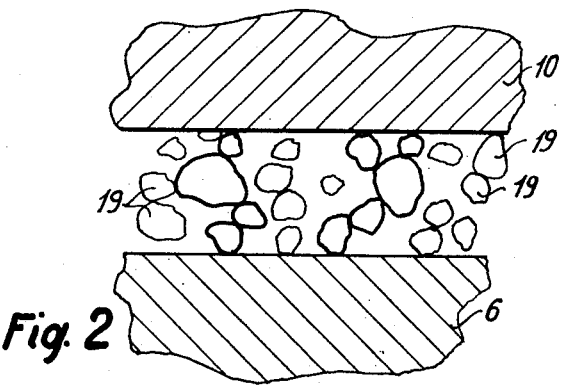

The accompanying drawing represents, by way of example, in FIG. 1, a known machine permitting the carrying out of the process forming the subject of the invention. FIG. 2 shows to a larger scale the conducting particles disposed between a work-piece and an electrode.

The machine shown in FIG. 1 comprises a framework 1 to which is secured, on the one hand, a motor 2 with the interposition of an insulating part 3 and, on the other hand, a table 4 capable of being displaced by an operating handle 5. This table carries a work-piece 6 which is secured in a known manner by means of a clamping part 7, a wedge 8 and a bolt 9.

The motor 2 carries, fixed to its shaft, an electrode constituted by a disc 10, which is driven in rotation opposite the work-piece 6 to be machined. The other end of the shaft of the motor 2 drives a pump 11 which sucks, through a passage 12, a liquid contained in a reservoir 13 for passing it under pressure, through a passage 14, to a nozzle 15 which is directed in such a manner as to pass the jet of liquid between the electrode and the work-piece 6 to be machined. The liquid which has served for spraying the work-piece and the electrode is collected in a groove 16 of the framework 1 and can return to the reservoir 13 through a passage 17.

A source of electric energy of which the negative and positive terminals are respectively represented by $a$ and $b$, permit of causing current to pass between the electrode and the work-piece. The terminal $a$ is connected to the electrode 10 through the medium of a friction contact 18, whilst the terminal $b$ is connected directly to the table 4.

According to one form of construction of the present invention a liquid containing solid and conducting particles in suspension is interposed between the electrode and the work-piece. These particles, for example, may be of carbon, a metallic powder, especially aluminum, copper or iron, or a metallic oxide conductor, such as for example, silver oxide, or even a metallic salt. The liquid constituting the support for these conducting particles may be constituted, for example, by an oil, by a solution of aqueous salts, or even by a fatty alcohol, such as glycerine or ethylene glycol, said fatty alcohol may be pure or mixed with water. The liquid may be insulating or conducting and is particularly intended to support the solid particles in such a manner as to permit of the application of the process to existing machines. It will be understood that the liquid assures at the same time, the cooling of the work-piece and of the electrode in the course of machining.

FIG. 2 shows, to a larger scale, the arrangement of the conducting particles 19 at a given instant between the electrode 10 and the work-piece 6, which are in relative movement. Some of these particles 19 are in contact with one another and form bridges which connect electrically the electrode and the work-piece. The particles forming these bridges are indicated in the drawing by much thicker lines. During the relative movement between the electrode and the work-piece, these bridges are continually destroyed, whilst other bridges are re-formed. Each time that a bridge is formed, a relatively high electric current passes between the work-piece and the end particle of the bridge which is in contact therewith. There is then produced a transfer of metal from the anode which is formed by the work-piece, to the cathode, which is constituted by the conducting particle under consideration, this transfer of metal taking place in the absence of any arcing phenomenon and being konwn in itself under the name of fine transfer, in the technical field which relates to the wear of contacts in switches, relays and so forth.

The distance between the work-piece and the electrode may be substantially larger than in the case of known processes and in principle it is inferior to 0.1 mm. The dimension of the particles 19 may advantageously be comprised between 0.2 and 20 microns, it being understood that this dimension should be smaller than the distance between the work-piece and the electrode. In view of the relative dimension of the particles and the distance between the work-piece and the electrode, a large number of bad successive contacts are obtained per unit of time, many of these contacts being capable of taking place simultaneously. At each contact, a fine transfer of metal takes place and by reason of the small quantity of metal transferred each time, a high quality of machined surface is obtained. However, the quantity of metal removed per unit of time is high, by reason of the very high frequency of the electric contacts which are produced between the work-piece and the electrode, through the medium of bridges formed by the particles 19. By way of example, it may be pointed out that, on a surface to be machined of 20 mm.$^2$, there has been observed with a wide band cathode-ray oscillograph, a number of contact ruptures rising to about 5 millions per second.

It is advantageous to use a source of current of which the voltage is inferior to that necessary for maintaining a continuous arc between the electrode and the work-piece. Preferably the difference of potential applied between the work-piece and the electrode is less than 12 volts, so that any danger of maintained arcs is eliminated. Meanwhile high instantaneous voltages may be produced between the work-piece and the electrode, by reason of the self-induction of the supply circuit and of the sudden breaking of the current. It is of interest to limit these peak-voltages, which can be obtained easily by branching a condenser of high capacity between the work-piece and the electrode. By way of example, it is possible to employ a condenser of 20,000 mf., which permits of limiting the instantaneous voltage to a maximum value of about 40 volts when using a current of the order of 60 amps. In this manner a sustained arc of long duration cannot be produced.

The presence of a supporting liquid is not absolutely necessary and it may very well be omitted. In particular, it is possible to apply the conducting particles directly to the surface of the work-piece or to the electrode but preferably to this latter. In this case, and when the electrode is constituted by a rotary disc, it is possible to apply to its surface the conducting particles by rubbing against said disc a rod of agglomerated particles, for example, by means of a pasty support. It is also possible to apply a metallic powder or oxide, or even carbon so that it comes between the electrode and the work-piece. For this purpose, it is possible to provoke the movement of the powder and to impart thereto the desired direction by means of a current of air which will constitute the transporting agent for the particles. In these two latter cases, it is possible to provide an independent spraying device for the cooling.

It will be understood that it is possible to use all kinds of conducting particles and in particular it is possible to constitute mixtures of different kinds of particles indicated above. Further, when using a liquid, the latter may be constituted by a complex mixture of different liquids. In a general manner, it is advantageous that the liquid is relatively viscous so as to obtain a stable suspension of the conducting particles. Good results are obtained when the liquid comprises a wetting agent, which has the effect of facilitating the distribution of the fluid between the electrode and the work-piece and to stabilize the suspension by preventing the particles from agglomerating.

*Example*

As liquid for machining there is used, in a machine of the type shown in FIG. 1, a mixture comprising in weight 60% glycerine, 30% of water and 10% of graphitic carbon, of which the size of the grains is limited to 5 microns. With this liquid, it has become easy to remove 30 mm.$^3$ per minute from a part to be machined of cobalt tungsten carbide, with a current of 60 amperes, under a voltage of 8 volts, the machined surface being 0.5 cm.$^2$. The electrode was constituted by a disc of copper of which the peripheral speed was 22 m./sec. and of which the wear was 1.8% in volume of the quantity of material removed from the work-piece.

By way of comparison, it is to be observed that in the case of machining by electro-erosion with a part and an electrode of the same nature, the speed of machining would have been at the maximum 1 mm.$^3$ per minute, whilst the wear of the electrode should have been ten times greater. Further, the liquid used in this example is not inflammable like those employed in the process by electro-erosion, nor corrosive as is the case for saline solutions used in the known electrolytic process. A very fine machining is obtained, corresponding to an unevenness of 50$\mu$ inch R.M.S During the machining there are observed sheaves of sparks which substantially resemble those obtained during the grinding of a piece of iron by an abrasive grindstone.

It will be understood that it is possible to apply many modifications to known machines for this type of machining and, in particular, the electrode may be constituted by a piece of hard graphite or by a metal part eventually containing abrasive particles. It is also possible to resort to electrodes which substantially differ from a rotary disc, whereby the electrode may be, for example, constituted by a tube or even by a conducting band in movement.

I claim:

1. In an electro-erosion process where an electric current is passed between a workpiece and an electrode, the steps which comprise maintaining between the workpiece and electrode a gap having a width of less than 0.1 mm., directing into said gap a stream of solid electrically conductive particles having a dimension smaller than said gap in the range of about 0.2 to 20 microns, and applying across said gap a voltage smaller than the voltage required to produce continual spark or arc discharges, said conductive solid particles being applied in a concentration forming recurrent electrically conductive bridges across the gap, which bridges break up almost immediately after formation and produce electroerosive dislodgement of particles from the workpiece by means of fine transfer.

2. The process claimed in claim 1 wherein said electrically conductive particles are applied in a suspending liquid.

3. The process claimed in claim 2 wherein said suspending liquid is an oil.

4. The process claimed in claim 2 wherein said suspending liquid is a mixture of glycerine and water.

5. The process claimed in claim 2 wherein said suspending liquid contains a wetting agent.

6. The process claimed in claim 1 wherein said solid electroconductive particles consist essentially of a member of the group consisting of carbon, metals, and mixtures thereof.

7. A process according to claim 1, wherein a current of liquid is caused to pass against the surface of the work-piece to be machined, said liquid containing particles in suspension.

8. A process according to claim 1, wherein the maximum instantaneous voltage between the part and the electrode is limited to a value less than 40 volts.

9. A process according to claim 1, wherein a pasty material containing the said particles is interposed between the electrode and said work-piece.

10. A process according to claim 1, wherein the relative speed between the electrode and said work-piece is comprised between 10 and 30 meters/second.

11. A process according to claim 1, wherein the machining zone is cooled by means of a liquid free from conducting particles.

12. The process claimed in claim 1 wherein said workpiece and said electrode are maintained in relative movement to each other.

References Cited in the file of this patent

UNITED STATES PATENTS

| | | |
|---|---|---|
| 2,410,613 | Ruthruff | Nov. 5, 1946 |
| 2,766,364 | Higgins et al. | Oct. 9, 1956 |
| 2,838,652 | Porterfield | June 10, 1958 |
| 2,859,181 | Jordan | Nov. 4, 1958 |

FOREIGN PATENTS

| | | |
|---|---|---|
| 787,731 | Great Britain | Dec. 18, 1957 |